United States Patent Office 3,769,367
Patented Oct. 30, 1973

3,769,367
COLOR-STABILIZED POLYCARBONATE
COMPOSITION
Arnold Factor, Scotia, N.Y., assignor to
General Electric Company
No Drawing. Filed June 14, 1972, Ser. No. 262,566
Int. Cl. C08g 51/62
U.S. Cl. 260—860                                    12 Claims

ABSTRACT OF THE DISCLOSURE

A thermally stable, streak-resistant polycarbonate composition comprises an aromatic polycarbonate containing a stabilizing amount of a mixture of (a) cadmium and/or cerium benzoate and (b) an organic phosphite.

---

This invention is related to a thermoplastic aromatic polycarbonate composition having excellent resistance to color degradation at elevated temperatures, especially streaking during molding and in particular to a flame-retardant aromatic polycarbonate composition containing a stabilizer effective in preventing discoloration at elevated temperatures especially the production of off-colored streaks during molding.

It is well known in the art to prepare flame-retardant polycarbonate compositions by employing halogen-substituted bisphenol-A in the preparation thereof. Specifically, U.S. Patent 3,334,154 discloses such a composition wherein tetrabromobisphenol-A is employed to prepare a polycarbonate composition having excellent flame-retardant properties. Flame-retardant properties of thermoplastic compositions are extremely high in demand in the industry as a safety feature requirement. In fact, many applications for thermoplastics carry the requirement that the thermoplastic be flame-retardant, particularly where they are used by the public or are employed in areas where the public may gather.

As thermoplastics, particularly polycarbonates, find greater use in many new applications, there is a definite trend to higher molding temperatures due to the complicated geometry of the part to be molded and/or the molding of thinner walled sections. Higher molding temperatures are necessary in order for the polycarbonate to completely fill the mold cavity and thereby produce a satisfactory molded shape even through complicated in its design. Unfortunately, when employing flame-retardant polycarbonate compositions, as described by the prior art, color degradation of the flame-retardant polycarbonate composition occurs due to these higher molding temperaturs being employed. This color degradation or discoloration is generally evidenced by the appearance of unwanted streaks or areas of discolored polymer in the molded part.

It has now been discovered that these problems can be overcome by incorporating the hereinafter described composition as an additive into a flame-retardant aromatic polycarbonate composition. Only a very small, stabilizing amount of the additive needs to be employed. Generally, the amount is in the range of from 0.05 to about 2.0 weight percent of the additive based on the weight of the total polymer composition. Lesser amounts can be used with a consequent loss in effectiveness and larger amounts can be used with no increase in effectiveness and possibly some problems on molding due to splaying, i.e., surface imperfection due to the formation of a film or phase separation on the surface of the molded part. The additive employed herein is a mixture of (a) cadmium and/or cerium benzoate and (b) at least one organic phosphite. Various combinations of the above materials may be employed herein to render the flame-retardant polycarbonate composition color stable at elevated temperatures.

A further advantage to using the above composition is that they are soluble in the polycarbonate resins thereby permitting transparent molded objects to be made from the flame-retardant stabilized polycarbonates. Many of the prior stabilizers could only be used to make translucent or opaque molded objects because of their limited or complete insolubility in the polymer.

In my copending application, Ser. No. 262,565, filed concurrently herewith as a continuation-in-part of my copending, but subsequently abandoned application, Ser. No. 215,316, filed Jan. 3, 1972, both of which are assigned to the same assignee as the present invention, I have disclosed and claimed color-stabilized, flame-retardant carbonate polymers wherein the stabilizer is an equilibrated mixture of (a) a cadmium or cerium $C_{2-20}$ alkanoate, (b) a $C_{2-20}$ alkanoic acid, and (c) an organic phosphite. In that application all three components are necessary. Although cadmium stearate and diphenyl phosphite, without free acid, did give an improvement in stabilization, much better results were obtained when free alkanoic acid was present prior to equilibration. It was indeed surprising, therefore, to find that cadmium or cerium benzoate could be used with the organic phosphites as stabilizers for flame-retardant carbonate polymers, in the absence of free acid and that addition of benzoic acid to the mixture did not give any further improvement. What was even more surprising was to find that these benzoates were as good as or better stabilizers than the best of the cadmium or cerium alkanoates used with the alkanoic acids.

It is believed that color degradation as exhibited by streaking of the molded part is due to the thermal instability of the flame-retardant composition when exposed to the elevated temperatures during molding. As stated previously, it has now been discovered that this streaking effect or thermal instability can now be relieved or reduced substantially by incorporating the particular additive disclosed above with the flame-retardant polycarbonate composition.

The flame-retardant aromatic polycarbonate employed herein may be either (a) homopolycarbonates of a halogen-substituted dihydric phenol, (b) copolycarbonates of a dihydric phenol free of halogen substituents and a halogen-substituted dihydric phenol, (c) mixtures of (a) and (b), or (d) mixtures of (a) and/or (b) with homopolycarbonates of a dihydric phenol free of halogen substituents. Preferably, the mixture may be 30–99 weight percent and more particularly 70–99 weight percent of a homopolycarbonate of dihydric phenol free of halogen substituents and, correspondingly, 70–1 weight percent and more particularly, 30–1 weight percent of a copolymer of (1) 75–25 weight percent of a halogen-substituted dihydric phenol and, correspondingly, (2) 25–75 weight percent of a dihydric phenol free of halogen substituents. The weight percent of the above is based on the total weight of the polymers in the mixture. More particularly, the preferred system above employs chloro-substituted and/or bromo-substituted (preferably bromo-substituted) dihydric phenols.

In general, the halogen-free and halogen-substituted dihydric phenols employed herein are dihydric bisphenols or polynuclear aromatic compounds, containing as functional groups, two hydroxyl radicals, each of which is attached directly to a carbon atom of an aromatic nucleus. Typical, but not limiting, of some of the dihydric phenols that may be employed in the practice of this invention are bis(4-hydroxyphenyl)methane,
2,2-bis(4-hydroxyphenyl)propane (bisphenol-A),
2,2-bis(4-hydroxy-3-methylphenyl)propane,
4,4-bis(4-hydroxyphenyl)heptane,
2,2-bis-(3,5-dichloro-4-hydroxyphenyl)propane
 (tetrachlorobisphenol-A),
2,2-bis(3,5-dibromo-4-hydroxyphenyl)propane
 (tetrabromobisphenol-A),
bis(3-chloro-4-hydroxyphenyl)methane, etc.

Other suitable dihydric phenols are also available and are disclosed, for example, in U.S. Pats. 2,990,835, 3,028,365 and 3,334,154.

Generally, the polycarbonate employed herein can be prepared by any of the processes known in the art, for example, by reacting a dihydric phenol with a carbonate precursor in the presence of a molecular weight regulator, if desired, an acid acceptor and a catalyst. The preferred carbonate precursor generally employed in preparing carbonate polymers is carbonyl chloride also known as phosgene. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The cadmium or cerium salts of benzoic acids having from 1 to 5 alkyl, preferably lower alkyl and/or from 1 to 5 halo, preferably chlorosubstituents, for example, the cadmium or cerium salts of the isomeric toluic acids, the isomeric ethylbenzoic acids, the isomeric xylic acids, the isomeric chlorobenzoic acids, the isomeric chlorotoluic acids, etc. can be used, but they are no more effective, are less readily available and are more expensive than the corresponding salts of benzoic acid. Therefore, there is no incentive to use cadmium or cerium salts of other than benzoic acid in the practice of this invention.

The phosphites that are employed in the practice of this invention have the formula:

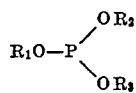

wherein $R_1$, $R_2$ and $R_3$ are independently selected from the group consisting of hydrogen, alkyl, aryl, cyloalkyl, arylalkyl and alkylaryl radicals wherein at least one R is other than hydrogen. Preferably the radicals have 1 to 20 carbon atoms. The alkyl may be methyl, ethyl, propyl, isopropyl, the various butyl isomers, e.g., butyl, sec.-butyl, tert.-butyl, the various amyl isomers, the various hexyl isomers, the various nonyl isomers, the various eicosyl isomers, etc.; the cycloalkyl may be cyclobutyl, cyclopentyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyls substituted with one or more of the above aryl groups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyl dodecyl phosphite, diphenyl phosphite, triphenylphosphite, di-(t-butylphenyl)octyl phosphite, triethyl phosphite, tris(nonylphenyl)phosphite, dipropyl phenyl phosphite, etc. The preferred phosphites to be employed herein are diaryl phosphites, e.g., diphenyl phosphite, etc., and diaryl alkyl phosphites, e.g., diphenyl decyl phosphite, etc.

The additive employed in the practice of this invention is a mixture as set forth previously. The amounts of the component parts of the mixture may vary from about 0.5 to 3 moles of the phosphite component of the mixture per mole of the cadmium or cerium benzoate. Preferably, the mixture employed herein is 1.5 moles of the phosphite per mole of cadmium or cerium benzoate.

Phosphites are hydrolyzed by water. So-called "dry" polycarbonate resin still contains several tenths of a percent sorbed water. Whenever a mixture of the metal benzoate and phosphite are in contact with moist air or with the polycarbonate resin, equilibration, which follows the law of mass action, occurs between the cadmium or cerium benzoate and the phosphite with the production of some free benzoic acid, the alcohol or phenol and their benzoate esters of one of the R substituents of the phosphite. During extrusion or molding of the stabilized polymer, thermal equilibration may occur.

The products of the equilibration do not deleteriously affect the ability of the mixture to stabilize the polymer so there is no need to take precautions to exclude moisture other than those normally taken in storing the granules of any polymer prior to molding. In my work with the stabilizers of this invention, I have always detected some products of equilibration but have never noted that their concentrations affected the ability of the mixture to stabilize the polymer. Of course, one avoids prolonged exposure of the stabilizer mixture to extremely humid atmospheres or direct contact with water. It is such a mixture as described above that I refer to in the claims as an equilibrated mixture of a cadmium or cerium benzoate and a phosphite of the designated formula. As mentioned previously, benzoic acid, above that amount produced by the above equilibration may be added but is not necessary.

In order that those skilled in the art may understand my invention, the following examples are given by way of illustration and not by way of limitation. Unless otherwise specified, parts and percentages are by weight.

EXAMPLE 1

A standard test molding composition was prepared by mixing (a) 1 part of a copolymer prepared by reacting 50 weight percent of 2,2-bis(4-hydroxyphenyl)propane, also known as isopropylidene-p,p'-biphenol (hereinafter referred to as bisphenol-A), 50 weight percent of 2,2-bis (3,5-dibromo-4-hydroxyphenyl)propane and phosgene in a methylene chloride reaction medium containing therein p-tert-butylphenol, pyridine and calcium hydroxide, and (b) 4 parts of a bisphenol-A homopolymer prepared by reacting bisphenol-A with phosgene in a methylene chloride reaction medium containing therein triethylamine, p-tert-butylphenol and calcium hydroxide. After these polymers are recovered from solution in solid form and dried overnight at 125° C., they are blended with 0.042 part titanium dioxide pigment and extruded at a temperature of about 525° F. The extrudate is comminuted into pellets.

The above composition is then injection molded into test specimens of 3" x 2" x 0.125" thick at a molding temperature of 740° F.

Severe color degradation occurs as observed by the dark streaks appearing in the discolored molded shape. In addition, the molded specimens are brittle compared to the nonbromine containing polycarbonate and frequently break as they are ejected from the mold.

The following table gives the composition and percentages of the stabilizers incorporated in the above test polymer by blending with the polymer before the extrusion to form the pellents and the comparison of the molded test pieces with the test piece from Example 1. Xylene was present only as a solvent for the stabilizer, but evaporated during processing.

TABLE

| Ex. | Composition of stabilizer system [a] [b] (weight percent) | Result [c] |
|---|---|---|
| 2 | 0.125% CdBz plus 0.145% DPP plus 0.23% xylene | +++ |
| 3 | 0.125% CdBz plus 0.145% DPP plus plus 0.23% xylene plus 0.1% BzOH | ++ |
| 4 | 0.165% CeBz plus 0.15% DPP plus 0.185% xylene | ++ |
| 5 | 0.5% DPDP | 0 |
| 6 | 0.5% DPP | — |
| 7 | 0.5% CdBz | — |
| 8 | 0.5% CeBz | — |

[a] Mixtures preheated at 212° F. for 30 minutes prior to formulation.
[b] Key: CdBz=Cadmium benzoate; CeBz=Cerium benzoate, BzOH=Benzoic acid; DPDP=Diphenyldecylphosphite; DPP=Diphenylphosphite.
[c] Key: +++ =Excellent streak inhibition; ++ = Good streak inhibition; + =Some streak inhibition; "0"=No effect; — =Worse streaking and color.

EXAMPLE 9

Equally good results are obtained when tridecylphosphite, triphenyl phosphite, diphenyl decyl phosphite, or any of the other above disclosed phosphites are used in place of the diphenyl phosphite in the above examples.

EXAMPLE 10

Equally good results were obtained when the stabilizer of Example 2 was used in a flame-retardant polycarbonate composition which was the same as that of Example 1 except that tetrachlorobisphenol-A was used in place of the tetrabromobisphenol-A in an amount to give an 11.1% chlorine content in the blended polymer.

Although the above examples and teachings have illustrated many of the variations and modifications that can be made in the practice of my invention, nevertheless other variations and/or modifications will be apparent to those skilled in the art. For example, various dyes, pigments, extenders, flow modifiers, fillers, etc., can be incorporated in the polymers. Although the polymers of this invention have been described in terms of their use in making of flame-retardant molded parts, they can also be used to produce other useful shapes such as sheets, rods, films, etc. It is to be understood that changes can be made in the particular embodiments of the invention described which are within the fully intended scope of the invention as defined by the appended claims.

What I claim is new and desire to secure by Letters Patent of the United States is:

1. A color-stabilized, flame-retardant carbonate polymer comprising an aromatic, halogen-containing carbonate polymer containing a stabilizing amount of an equilibrated mixture of cadmium or cerium benzoate and a phosphite having the formula:

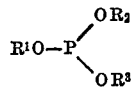

where $R^1$, $R^2$, and $R^3$ are individually selected from the group consisting of hydrogen, $C_{1-20}$ alkyl, phenyl and $C_{1-20}$ alkyl substituted phenyl wherein at least one R is other than hydrogen.

2. The composition of claim 1, wherein said aromatic carbonate polymer is selected from the group consisting of (1) a copolycarbonate of a dihydric phenol free of halogen substituents and a halogen-substituted dihydric phenol, and (2) a blend consisting of (1) with a homopolymer of dihydric phenol free of halogen substituents.

3. The composition of claim 2, wherein the halogen-substituted dihydric phenol is a bromo-substituted dihydric phenol.

4. The composition of claim 1, wherein the aromatic polycarbonate is a mixture of 30–99 weight percent of a homopolymer of a dihydric phenol free of halogen substituents and, correspondingly, 70–1 weight percent of a copolymer of 25–75 weight percent of a dihydric phenol free of halogen substituents and 72–25 weight percent of a tetrahalo dihydric phenol.

5. The composition of claim 4, wherein the tetrahalo dihydric phenol is a tetrabromo dihydric phenol.

6. The composition of claim 4, wherein the dihydric phenol free of halogen substituents is a bis(hydroxyphenyl)alkane and the tetrahalo dihydric phenol is a bis(hydroxydibromophenyl)alkane wherein the alkane moieties have from 1 to 8 carbon atoms.

7. The composition of claim 6, wherein the benzoate is cadmium benzoate.

8. The composition of claim 1, wherein the benzoate is cerium benzoate.

9. The composition of claim 6, wherein the phosphite is diphenyl phosphite.

10. The composition of claim 6, wherein the phosphite is tridecyl phosphite.

11. The composition of claim 6, wherein the phosphite is diphenyl decyl phosphite.

12. The composition of claim 6, wherein the phosphite is triphenyl phosphite.

References Cited
UNITED STATES PATENTS

| | | | |
|---|---|---|---|
| 3,334,154 | 8/1967 | Kim | 260—860 |
| 3,305,520 | 2/1967 | Fritz et al. | 260—45.7 |
| 3,525,706 | 8/1970 | Calkins | 260—45.7 |
| 3,274,135 | 9/1966 | Norman et al. | 260—45.7 |
| 3,489,722 | 1/1970 | Kotani et al. | 260—45.7 |
| 2,627,475 | 2/1953 | Craig | 260—45.7 |
| 3,647,747 | 3/1972 | Bialous | 260—45.75 |
| 2,610,920 | 9/1952 | Hopkinson | 260—45.75 |
| 2,676,946 | 4/1954 | McCurdy et al. | 260—45.75 |
| 3,418,263 | 12/1968 | Hindersinn et al. | 260—45.75 |

DONALD E. CZAJA, Primary Examiner

V. P. HOKE, Assistant Examiner

U.S. Cl. X.R.

260—45.7P, 45.75R

UNITED STATES PATENT OFFICE
CERTIFICATE OF CORRECTION

Patent No. 3,769,367    Dated October 30, 1973

Inventor(s) ARNOLD FACTOR

It is certified that error appears in the above-identified patent and that said Letters Patent are hereby corrected as shown below:

Claim 4, line 6, change "72-25" to read -- 75-25 --

Signed and sealed this 19th day of March 1974.

(SEAL)
Attest:

EDWARD M. FLETCHER, JR.
Attesting Officer

C. MARSHALL DANN
Commissioner of Patents